United States Patent [19]

Hinterlong

[11] Patent Number: 5,291,324
[45] Date of Patent: Mar. 1, 1994

[54] COMPARISON APPARATUS WITH FREESPACE OPTICAL INTERCONNECTIONS BETWEEN OPTOELECTRONIC INTEGRATED CIRCUITS

[75] Inventor: Stephen J. Hinterlong, Elburn, Ill.

[73] Assignee: AT&T Bell Laboratories, Murray Hill, N.J.

[21] Appl. No.: 982,161

[22] Filed: Nov. 24, 1992

[51] Int. Cl.$^5$ .................. H04J 14/08; H04B 10/00; G02F 1/00
[52] U.S. Cl. .................. 359/135; 359/107; 359/109; 359/117; 359/139; 385/14; 364/713
[58] Field of Search ............ 359/109, 117, 135, 138, 359/139-140, 163, 107; 385/14, 8-9, 24; 250/227.2; 364/713

[56] References Cited

U.S. PATENT DOCUMENTS

| | | | |
|---|---|---|---|
| 4,912,521 | 3/1990 | Almquist et al. | 385/14 |
| 5,093,743 | 3/1992 | Eng et al. | 359/117 |
| 5,105,292 | 4/1992 | Le Roy et al. | 359/117 |
| 5,153,757 | 10/1992 | Cloonan et al. | 359/135 |

OTHER PUBLICATIONS

F. B. McCormick, et al., "A Six-Stage Digital Free-Space Optical Switching Network Using S-Seeds", *Applied Optics: Information Processing*, 1992.
J. L. Brubaker et al., "Optomechanics of a Free Space Photonic Switch: the Components", *Optomechanics and Dimensional Stability*, Jul. 25-26, 1991, vol. 1533, pp. 88-96.
J. W. Goodman et al., "Optical Interconnections for VLSI Systems", *Proceedings of the IEEE*, vol. 72, No. 7, Jul. 1984, pp. 850-866.
W. H. Wu et al., "Implementation of Optical Interconnections for VLSI", *IEEE Transactions on Electron Devices*, vol. ED-34, No. 3, Mar. 1987, pp. 706-714.
R. K. Kostuk et al., "Optical Imaging Applied to Microelectronic Chip-to-Chip Interconnections", *Applied Optics*, vol. 24, No. 17, Sep. 1985, pp. 2851-2858 and p. 2864.
Y. Fujiyama et al., "ATM Switching System Evolution and Implementation for B-ISDN", *IEEE International Conference on Communications* (ICC'90), vol. 4, pp. 1577-1583.
D. Z. Tsang, "Optical Interconnections in Digital Systems-Status and Prospects", *Optics & Photonics News*, Oct. 1990, pp. 23-29.
T. K. Woodward et al., "Operation of a Fully Integrated GaAs-Al$_x$Ga$_{1-x}$As FET-Seed: A Basic Optically Addressed Integrated Circuit", *IEEE Photonics Technology Letters*, vol. 4, No. 6, Jun. 1992, pp. 614-617.
Texas Intrument data sheet, dated 1982.

*Primary Examiner*—Richard E. Chilcot, Jr.
*Assistant Examiner*—K. Negash
*Attorney, Agent, or Firm*—Ross T. Watland

[57] ABSTRACT

An exemplary packet processing apparatus where a large number of comparisons can be made concurrently in bit-parallel fashion by partitioning the comparison functionality to two optoelectronic integrated circuits, and interconnecting the two circuits using free space optics. Illustratively, different embodiments are used to perform one-to-many or many-to-one comparisons by developing multiple copies of one value for concurrent comparison with many possible values. The invention is more generally applicable to other comparison applications where one-to-many or many-to-one comparisons are made.

57 Claims, 14 Drawing Sheets

COMPARISON APPARATUS WITH FREESPACE OPTICAL INTERCONNECTIONS BETWEEN OPTOELECTRONIC INTEGRATED CIRCUITS

TECHNICAL FIELD

This invention relates to communication and computing technology, specifically including packet processing apparatus.

BACKGROUND AND PROBLEM

The term broadband covers a host of new products, technologies, services, and networks. One way to define broadband networks is to categorize them as those networks that support services requiring bit rates well above one megabits per second. Business and residential subscribers will be connected to broadband networks via a common access, operating at 150 megabits per second or above, that can handle a range of different broadband service types. ATM (asynchronous transfer mode) has been chosen as the communication principle on which broadband networks will be based. A future broadband ISDN (integrated services digital network) will offer the flexibility needed to handle diverse services ranging from basic telephone service to high speed data transfer, videotelephony, and high quality television distribution. The key to this flexibility is ATM which carries digital information in special cells. This allows the network to be used efficiently by applications and services with widely differing bandwidth requirements and call characteristics.

ATM cells have a five-byte header and a 48-byte payload. The header includes the routing information for the packet. It is important to compare this routing information to many possible values very rapidly. For example, if the bit rate is 155 megabits per second, an eight-byte header corresponds to approximately 0.25 microseconds. It is desirable to make the routing decision in this very short time period. What is needed is an apparatus capable of making very fast comparisons.

SOLUTION

This need is met and a technical advance is achieved in accordance with the principles of the invention in an exemplary packet processing apparatus where a large number of comparisons can be made concurrently in bit-parallel fashion by partitioning the comparison functionality to two optoelectronic integrated circuits, and interconnecting the two circuits using free space optics. Illustratively, different embodiments are used to perform one-to-many or many-to-one comparisons by developing multiple copies of one value for concurrent comparison with many possible values. The invention is more generally applicable to other comparison applications where one-to-many or many-to-one comparison are made The packet processing apparatus in accordance with the invention includes first and second optoelectronic integrated circuits. The first circuit includes first storing means for storing information and transmits an array of optical beams representing the information stored by the first storing means. Free space optical apparatus is used for imaging the beam array onto the second circuit. The second circuit includes second storing means for storing information and comparison circuitry for comparing the information represented by the beam array, with the information stored by the second storing means. A header of an input packet is transmitted to one of the first and second storing means. The other storing means stores at least one possible value. The second circuit generates a signal in response to a predefined comparison by the comparison circuitry.

In a first embodiment, the one storing means is the first storing means and the transmitted array represents multiple copies of the stored header. The second storing means stores many possible values. The comparison circuitry concurrently compares each of the multiple copies with a different one of the many possible values.

In a second embodiment, the other storing means is the first storing means and it stores many possible values. The transmitted array represents the many possible values. The second storing means stores multiple copies of the stored header. The comparison circuit concurrently compares each of the multiple copies with a different one of the many possible values.

In a third embodiment, a plurality of input packets are received by the first circuit, the one storing means is the first storing means and the transmitted array represents headers from the plurality of input packets. The second storing means stores multiple copies of only one possible value. The comparison circuit concurrently compares each of the multiple copies with a header from a different one of the plurality of input packets.

In a fourth embodiment, only one possible value is received by the first circuit, the other storing means is the first storing means and the transmitted array represents multiple copies of the one possible value. A plurality of input packets are received by the second circuit. The comparison circuit concurrently compares each of the multiple copies with a header from a different one of the plurality of input packets.

The first and second embodiments may be used to process packets prior to their transmission into a self-routing packet network. Information associated with each possible value is stored which defines a specific path through the self-routing packet network. This information becomes the comparison signal upon a positive comparison and is combined with other information from the input packet for transmission as an output packet into the packet network. The third and fourth embodiments may be used in a packet node, to separate packets destined for the node from packets destined for other nodes.

Multiple quantum well devices, specifically FET-SEED devices, are used in the first optoelectronic integrated circuit to transmit the array of optical beams. The beams are received by FET-SEED devices in the second optoelectronic integrated circuit.

Packets may be received either as serial, electrical signals or as optical signals, in either serial or parallel format.

The apparatus of the invention may be applied more generally for one-to-many and many-to-one comparisons of bit strings where multiple copies of one value are developed to reduce the time to make the comparisons. In addition to equality, the predefined comparison may be $<$, $>$, $<=$, $>=$, not equal, or any other comparison of some or all of the bits.

DRAWING

DETAILED DESCRIPTION

First Embodiment

Figure 1:
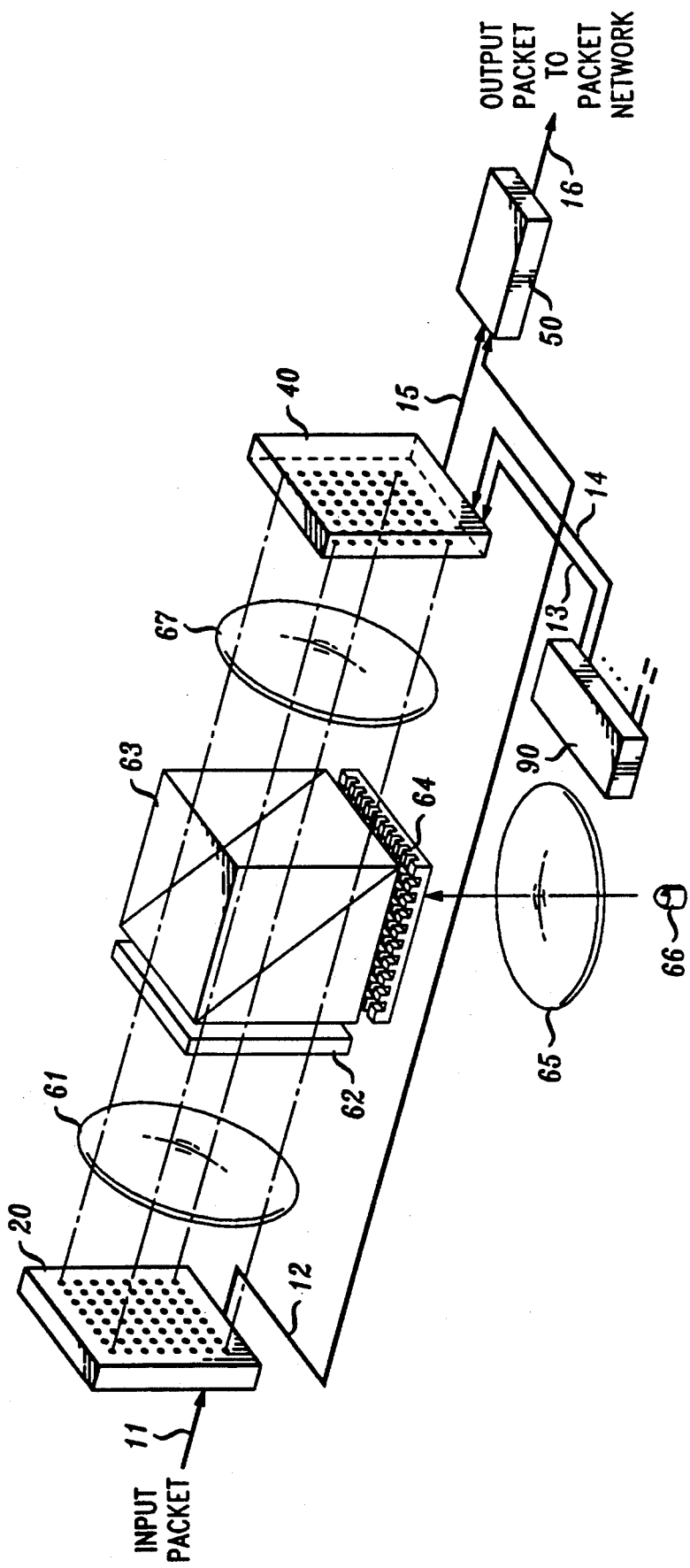
FIG. 1 is a functional diagram of a first embodiment in accordance with the invention.
Figure 2:
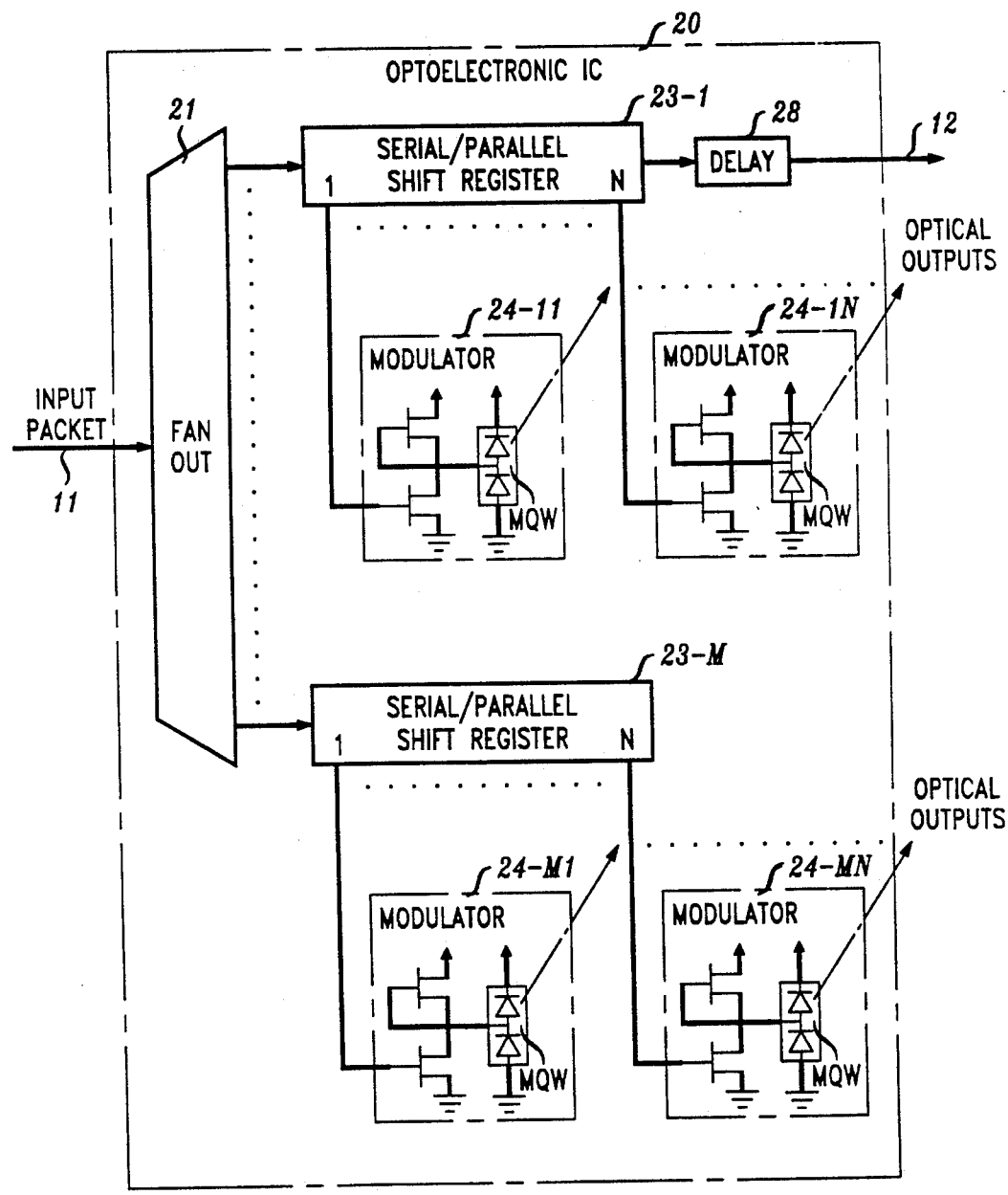
FIG. 2 is a circuit diagram of a first optoelectronic circuit in the embodiment of FIG. 1.

FIG. 1 is a diagram of a first embodiment comprising packet processing apparatus 10. An input packet including an N-bit header is received by a first optoelectronic integrated circuit 20 (FIG. 2) as a serial, electrical signal on line 11. Circuit 20 includes a fanout 21 which distributes the input packet to M, N-bit serial/parallel shift registers 23-1 through 23-M. When the N bits of the M copies of the packet header have been stored, they are transmitted as an array of optical beams by an array of modulators 24-11, 24-1N, 24-M1, 24-MN and are imaged via the free-space optical apparatus of FIG. 1 in a 1:1 fashion onto a second optoelectronic integrated circuit 40. The input packet from register 23-1 is delayed by N or more bits by a delay element 28 and transmitted as a serial, electrical signal via line 12 to an output packet transmitter 50.

Figure 3:
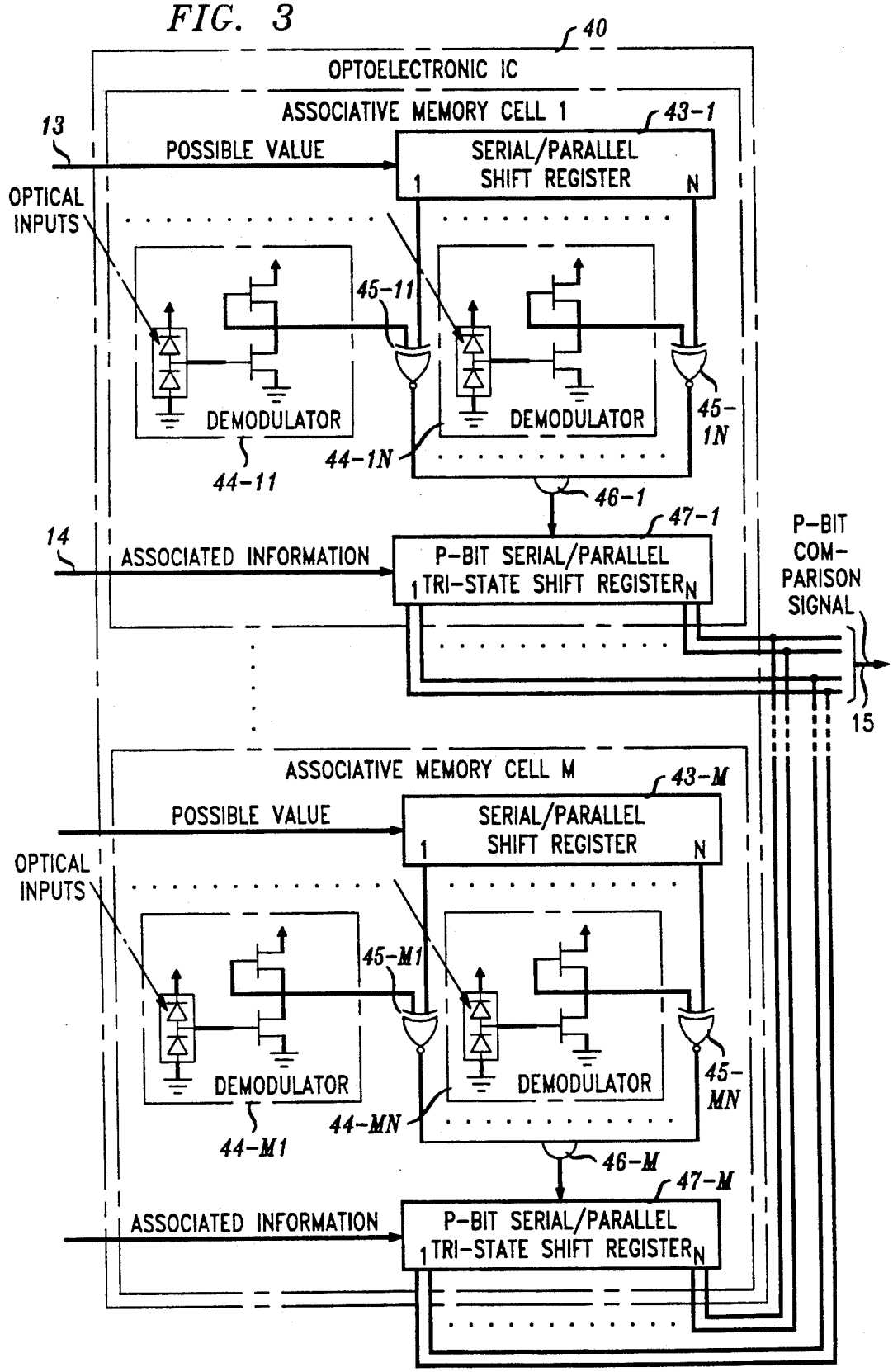
FIG. 3 is a circuit diagram of a second optoelectric circuit in the embodiment of FIG. 1.

A controller 90 writes M unique, possible N-bit header values into M, N-bit serial/parallel shift registers 43-1 through 43-M (FIG. 3.) Controller 90 also writes information associated with each of the M possible values into M, P-bit serial/parallel shift registers 47-1 through 47-M, each having tri-state outputs. The associated information is, for example, a self-routing header, used to route a packet through a self-routing packet network (not shown). Controller 90 writes an N-bit possible value and a corresponding P-bit self-routing header into circuit 40 as part of the process of establishing a virtual circuit. The M copies of the input packet header, represented by the array of optical beams from circuit 20, are received by an array of demodulators 44-11, 44-1N, 44-M1, 44-MN. The demodulators transmit corresponding electrical signals to an array of exclusive NOR-gates 45-11, 45-1N, 45-M1, 45-MN, which also receive each bit stored in registers 43-1 through 43-M. The bit comparison results of one input packet header copy with one of the M possible values are combined by an associated one of M, AND-gates 46-1 through 46-M. When, for example, the possible value stored by register 43-1 is equal to the corresponding input packet header copy, AND-gate 46-1 enables the transmission of the associated self-routing header, referred to as a comparison signal, from register 47-1 to transmitter 50 (FIG. 1). Transmitter 50 combines the input packet received on line 12 with the self-routing header and transmits the resulting output packet as a serial, electrical signal on line 16 to the packet network. There would typically be a plurality of packet processors such as apparatus 10 on the input side of the packet network.

Figure 13:
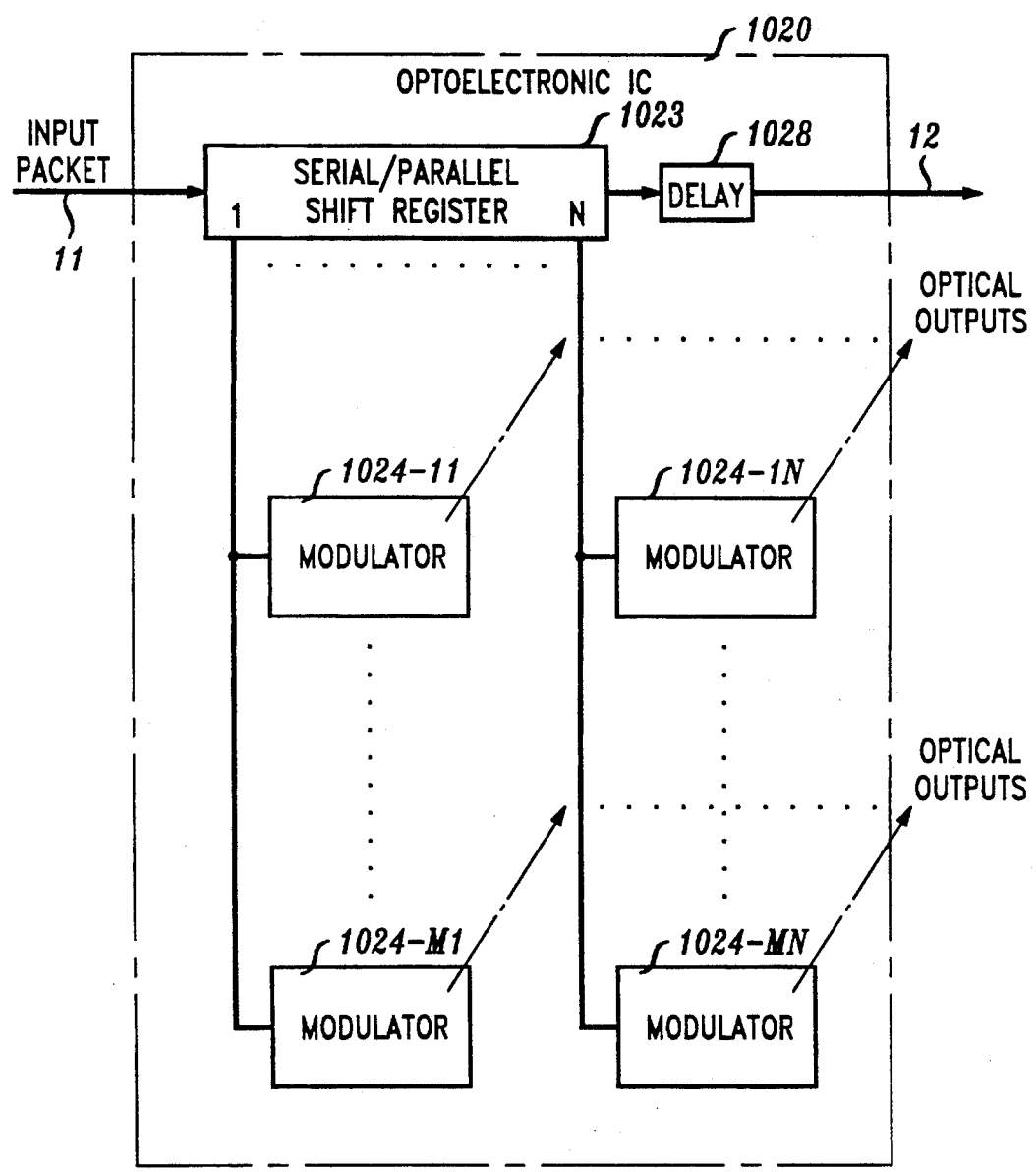
FIG. 13 is an alternative embodiment of the first optoelectronic integrated circuit of FIG. 2.

FIG. 13 is a diagram of an alternative first optoelectronic integrated circuit 1020 which would replace circuit 20 in apparatus 10 (FIG. 1). In circuit 1020 (FIG. 13), the input packet is received by a single N-bit serial/parallel shift register 1023. Each bit in register 1023 is transmitted to a corresponding column of modulators, e.g., 1024-11 through 1024-M1 or 1024-1N through 1024-MN. The MN modulators collectively transmit the array of optical beams representing M copies of the input packet header. The packet from register 1023 is delayed by at least N bits by a delay element 1028 and transmitted as a serial, electrical signal on line 12.

Second Embodiment

Figure 4:
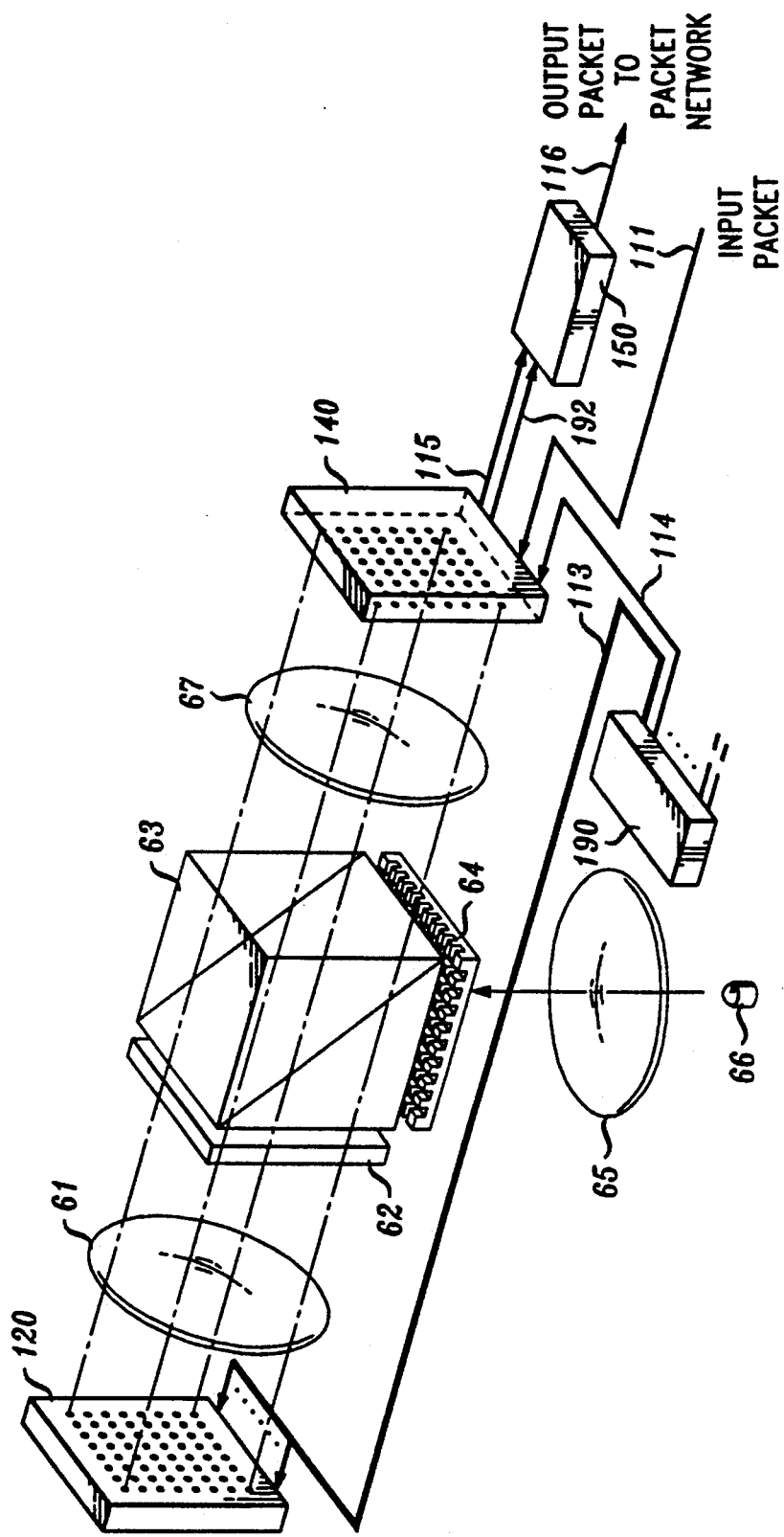
FIG. 4 is a functional diagram of a second embodiment in accordance with the invention.
Figure 5:
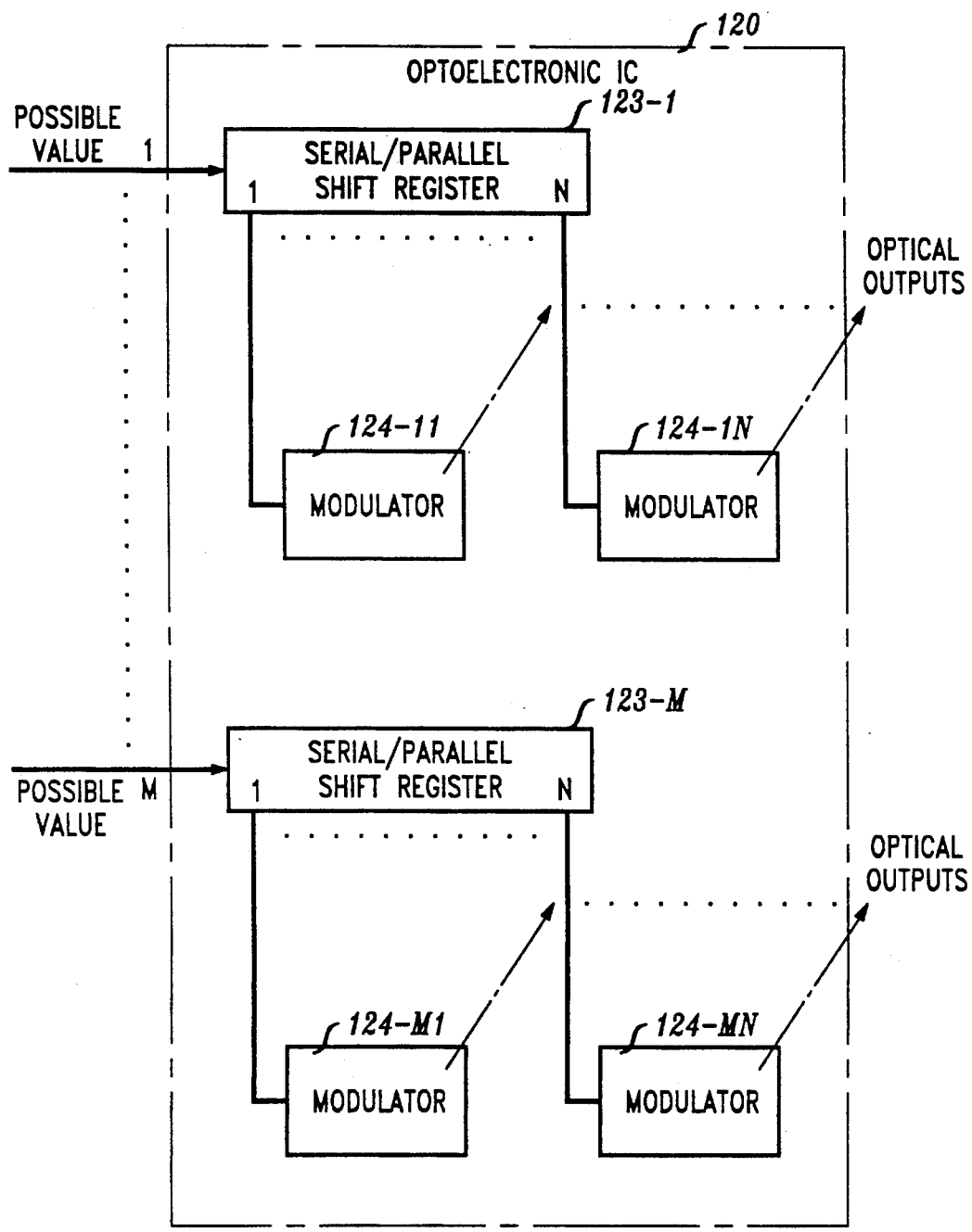
FIG. 5 is a circuit diagram of a first optoelectronic circuit in the embodiment of FIG. 4.

FIG. 4 is a diagram of a second embodiment comprising packet processing apparatus 110. A controller 190 writes M unique, possible N-bit header values into M, N-bit serial/parallel shift registers 123-1 through 123-M (FIG. 5). When the M header values have been stored, they are transmitted as an array of optical beams by an array of modulators 124-11, 124-1N, 124-M1, 124-MN and are imaged via the free-space optical apparatus of FIG. 4 in a 1:1 fashion onto a second optoelectronic integrated circuit 140.

Figure 6:
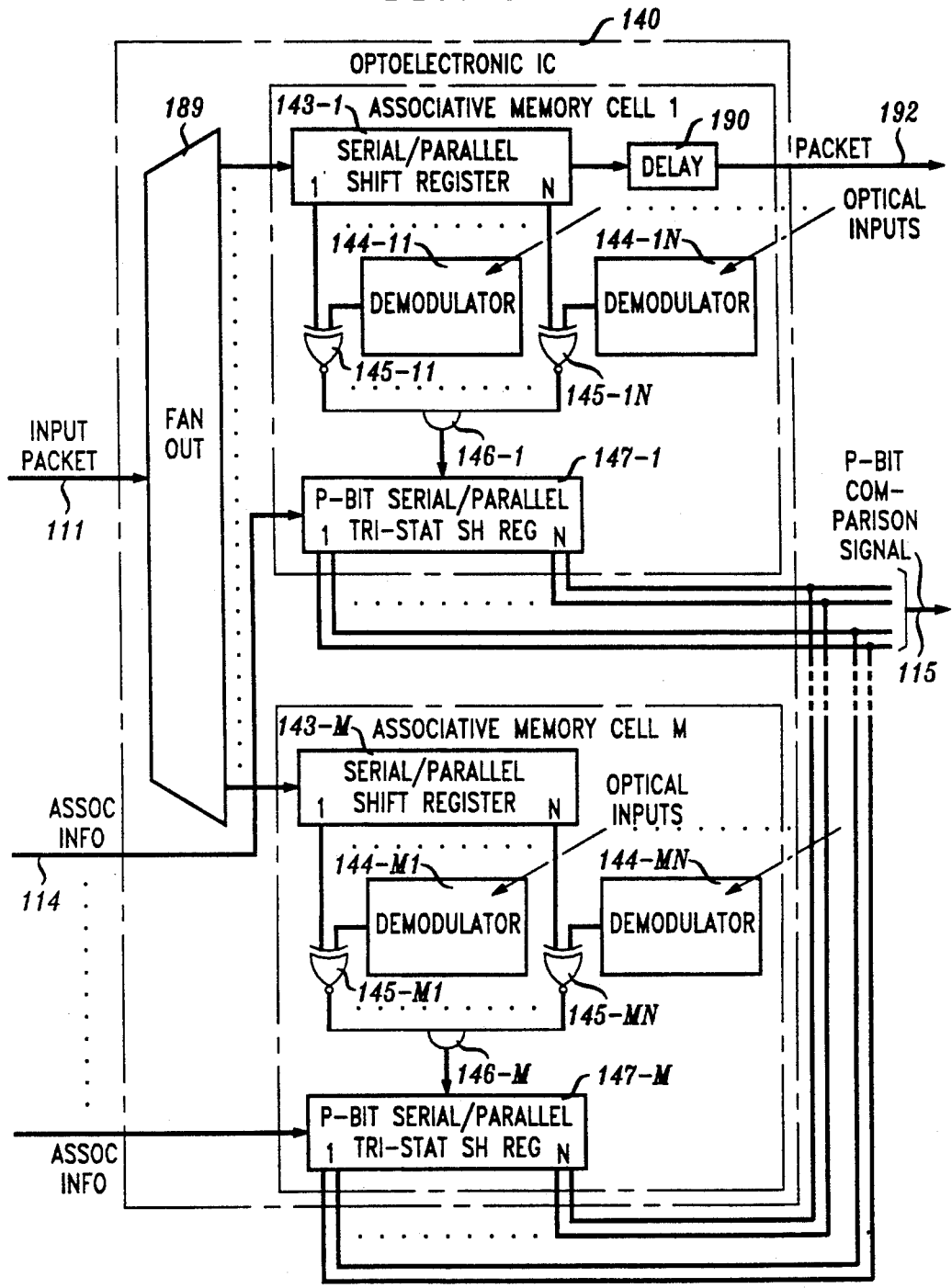
FIG. 6 is a circuit diagram of a second optoelectronic circuit in the embodiment of FIG. 4.

An input packet including an N-bit header is received by circuit 140 (FIG. 6) as a serial, electrical signal on line 111. Circuit 140 includes a fanout 189 which distributes the input packet to M, N-bit serial/parallel shift registers 143-1 through 143-M. The input packet from register 143-1 is delayed by N or more bits by a delay element 190 and transmitted as a serial, electrical signal via line 192 to an output packet transmitter 150 (FIG. 4). Controller 190 writes information associated each of the M possible values into M, P-bit serial/parallel shift register 147-1 through 147-M (FIG. 6), each having tri-state outputs. The associated information is, for example, a self-routing header, used to route a packet through a self-routing packet network (not shown). Controller 190 writes an N-bit possible value into circuit 120 and a corresponding P-bit self-routing header into circuit 140 as part of the process of establishing a virtual circuit. The M possible values represented by the array of optical beams from circuit 120, are received by an array of demodulators 144-11, 144-1N, 144-M1, 144-MN. The demodulators transmit corresponding electrical signals to an array of exclusive NOR-gates 145-11, 145-1N, 145-M1, 145-MN, which also receive each bit stored in registers 143-1 through 143-M. The bit comparison results of each input packet header copy with one of the M possible values are combined by an associated one of M, AND-gates 146-1 through 146-M. When, for example, the input packet header copy stored by register 143-1 is equal to the corresponding possible value, AND-gate 146-1 enables the transmission of the associated self-routing header, referred to as a comparison signal, from register 147-1 to transmitter 150 (FIG. 4). Transmitter 150 combines the input packet received on line 192 with the self-routing header and transmits the resulting output packet as a serial, electrical signal on line 116 to the packet network. There would typically be a plurality of packet processors such as apparatus 110 on the input side of the packet network.

Third Embodiment

Figure 7:
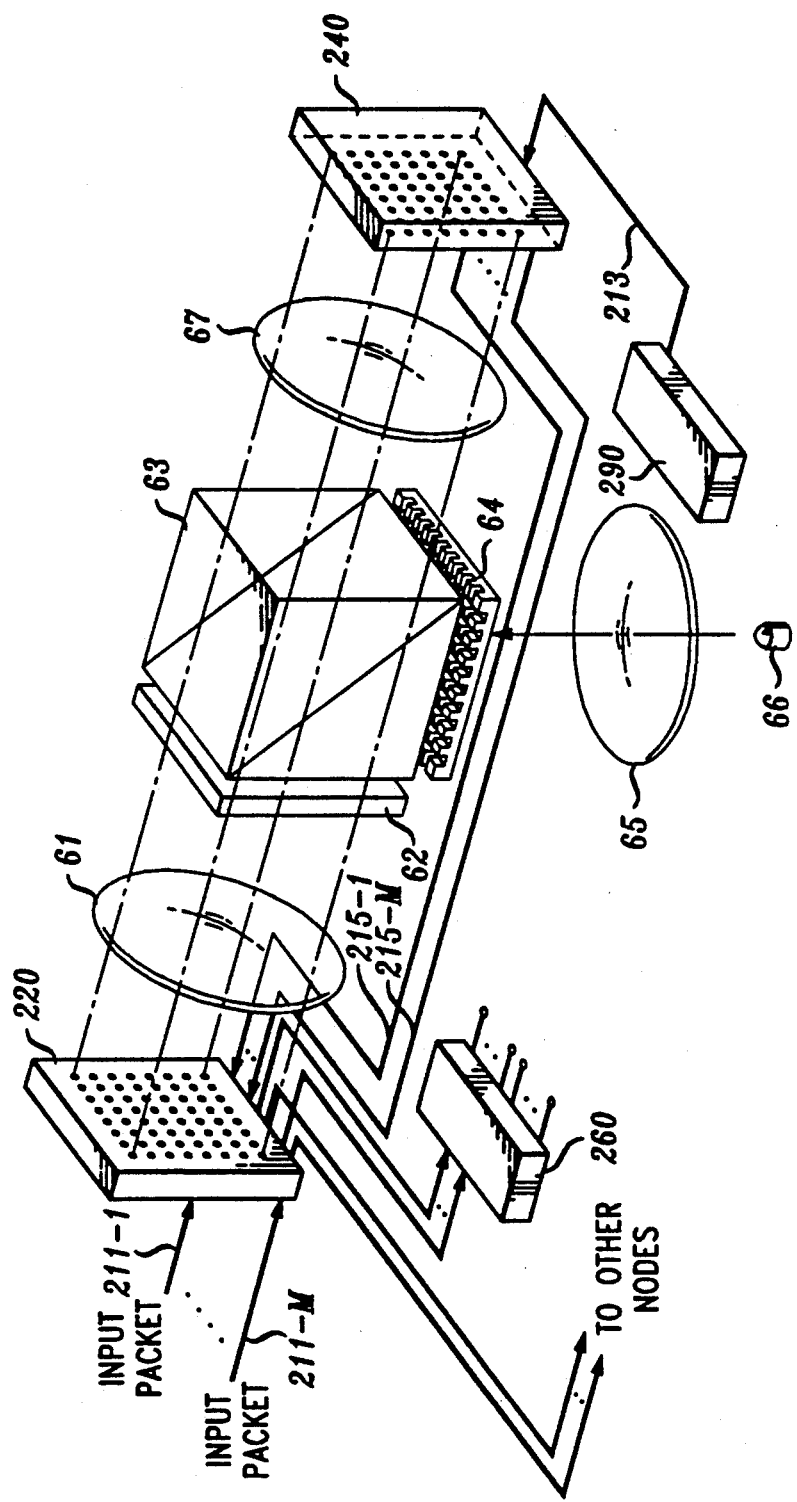
FIG. 7 is a functional diagram of a third embodiment in accordance with the invention.
Figure 8:
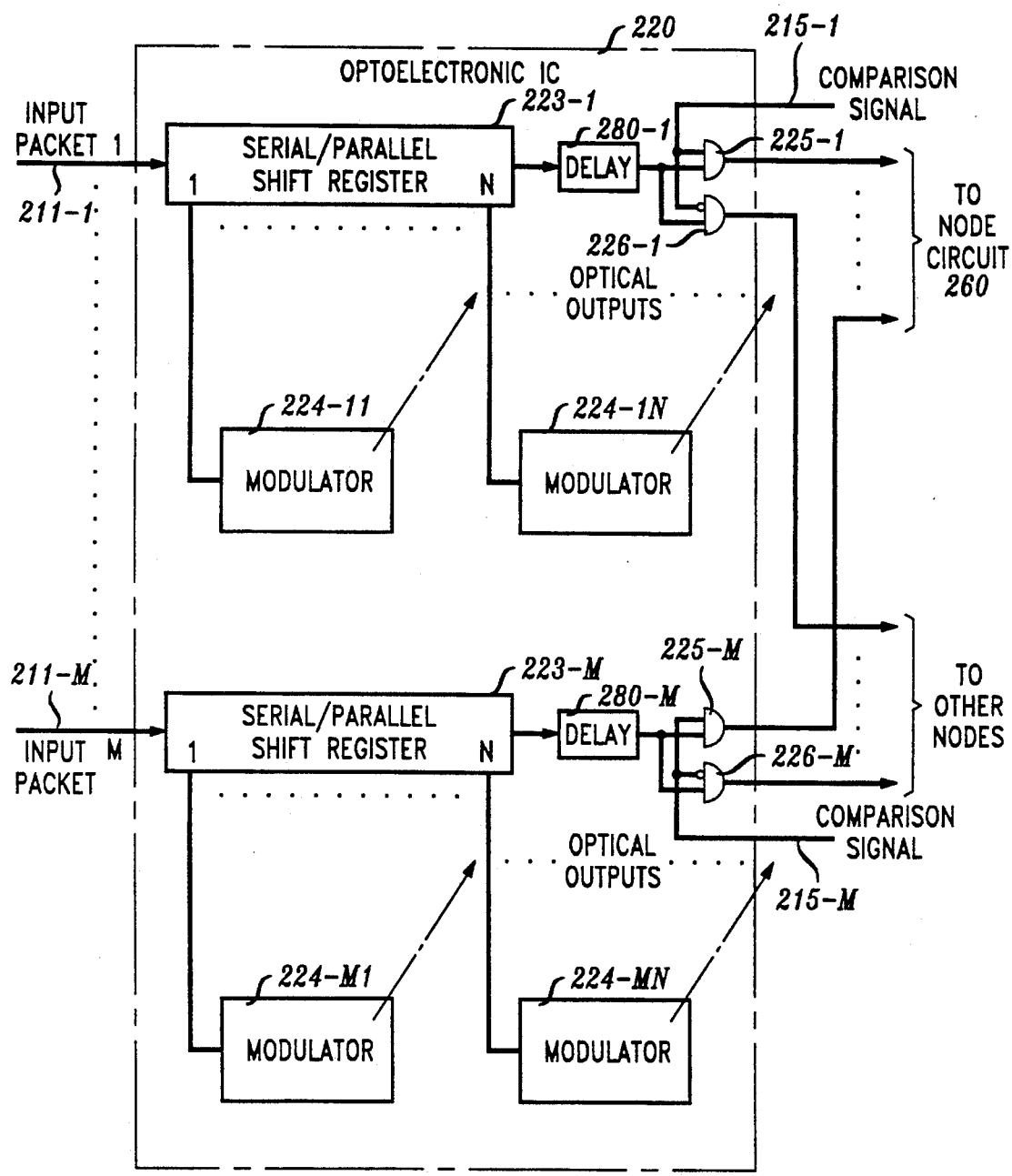
FIG. 8 is a circuit diagram of a first optoelectronic circuit in the embodiment of FIG. 7.

FIG. 7 is a diagram of a third embodiment comprising packet processing node 210. A plurality, M, of input packets including N-bit headers are received by a first optoelectronic integrated circuit 220 (FIG. 8) as a plurality of serial, electrical signals on lines 211-1 through 211-M. The M packets are received by M, N-bit serial/-parallel shift registers 223-1 through 223-M. When the N bits of the M input packet headers have been stored, they are transmitted as an array of optical beams by an array of modulators 224-11, 224-1N, 224-M1, 224-MN and are imaged via the free-space optical apparatus of FIG. 7 in a 1:1 fashion onto a second optoelectronic integrated circuit 240.

Figure 9:
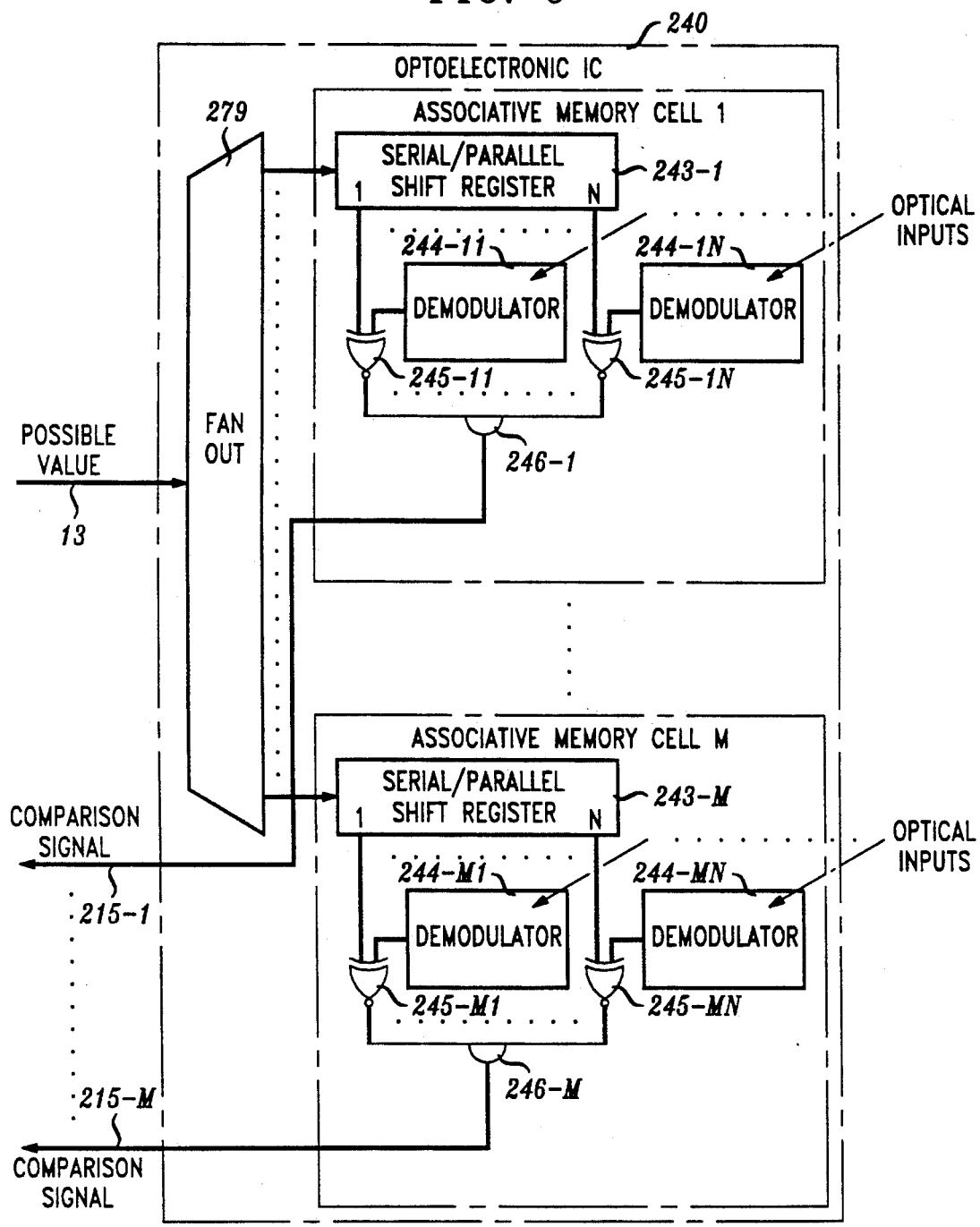
FIG. 9 is a circuit diagram of a second optoelectronic circuit in the embodiment of FIG. 7.

A controller 290 transmits a single, possible N-bit header value via line to a fanout 279 (FIG. 9), which distributes M copies of the single possible value to M, N-bit serial/parallel shift registers 243-1 through 243-M. The M input packet headers, represented by the array of optical beams from circuit 220, are received by an array of demodulators 244-11, 244-1N, 244-M1, 244-MN. The demodulators transmit corresponding electrical signals to an array of exclusive NOR-gates 245-11, 245-1N, 245-M1, 245-MN, which also receive each bit stored in registers 243-1 through 243-M. The bit comparison results of one input packet header with one of the M possible value copies are combined by an associated one of M, AND-gates 246-1 through 246-M. When, for example, the possible value copy stored by register 243-1 is equal to the corresponding input packet header, AND-gate 246-1 transmits a logic one comparison signal on line 215-1. Similarly, when the possible value copy stored by register 243-M is equal to the corresponding input packet header, AND-gate 246-M transmits a logic one comparison signal on line 215-M.

The M input packets from registers 223-1 through 223-M (FIG. 8), are delayed, for a time sufficient for comparison signals to be returned from circuit 240, by a plurality of delay elements 280-1 through 280-M, and are transmitted as serial, electrical signals to a plurality of AND-gates 225-1 through 225-M, and to a plurality of AND-gates 226-1 through 226-M, each of the latter gates having one inverting input. When a logic one comparison is received on one of the lines 215-1 through 215-M, the associated one of the AND-gates 225-1 through 225-M transmits the input packet to a node circuit 260 which performs further packet processing for node 210. When a logic zero comparison signal is received on one of the lines 215-1 through 215-M, the associated one of the AND-gates 226-1 through 226-M transmits the input packet to one of a plurality of other packet processing nodes (not shown).

Figure 10:
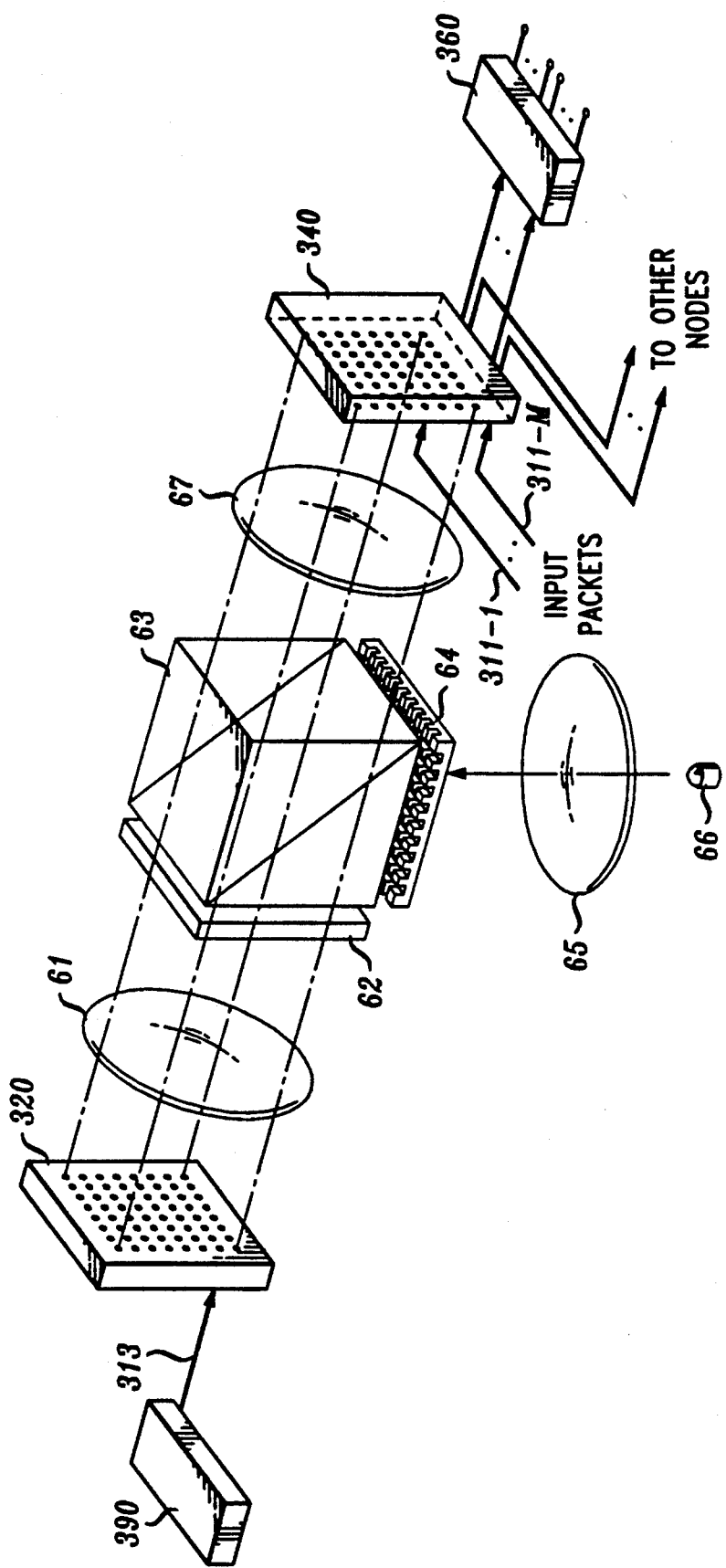
FIG. 10 is a functional diagram of a fourth embodiment in accordance with the invention.
Figure 14:
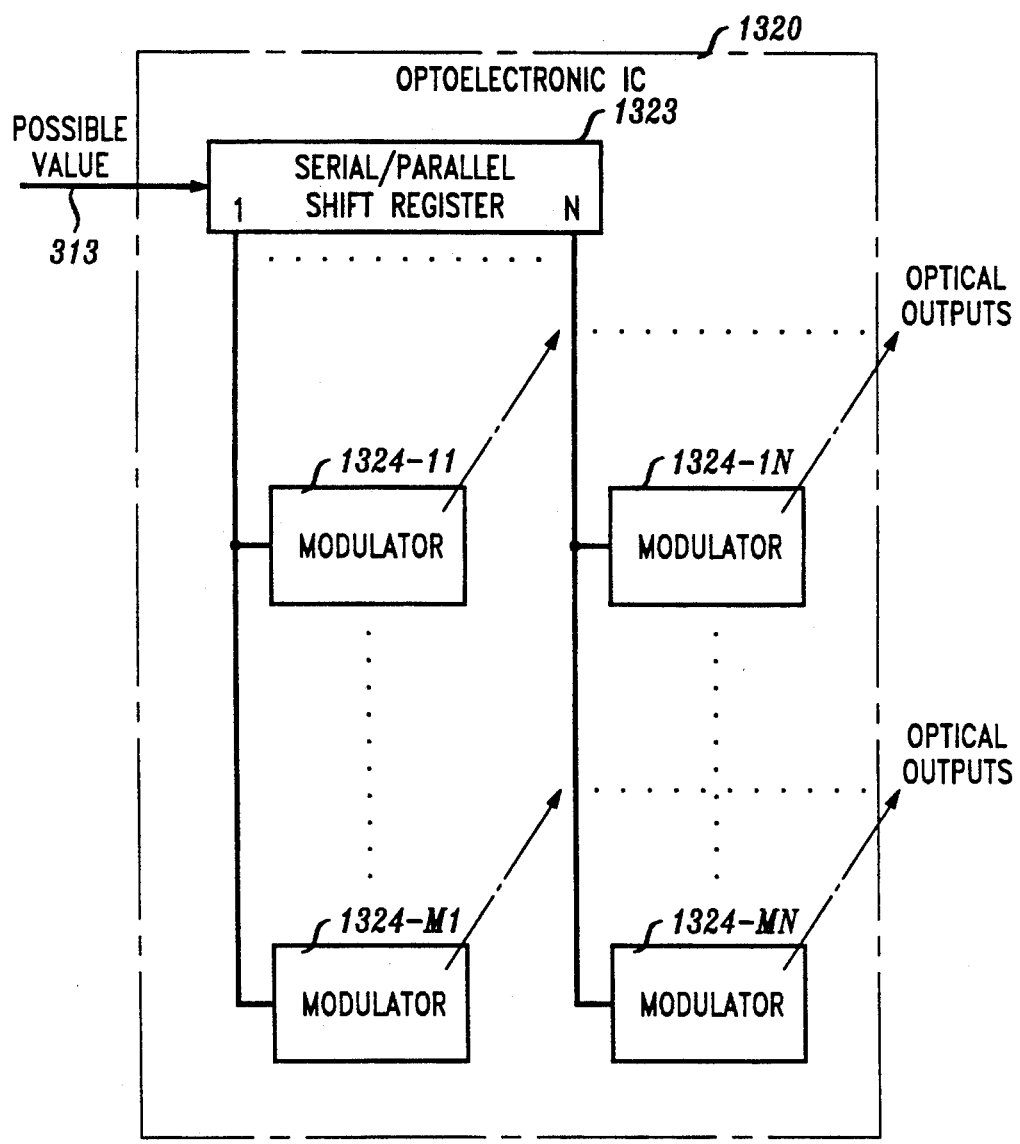
FIG. 14 is an alternative embodiment of the first optoelectronic integrated circuit of FIG. 11.

FIG. 14 is a diagram of an alternative first optoelectronic integrated circuit 1320 which would replace circuit 320 in apparatus 310 (FIG. 10). In circuit 1320 (FIG. 14), the single possible value is received by an N-bit serial/parallel shift register 1323. Each bit in register 1323 is transmitted to a corresponding column of modulators, e.g., 1324-11 through 1324-M1 or 1324-1N through 1324-MN. The MN modulators collectively transmit the array of optical beams representing M copies of the single possible value.

Fourth Embodiment

Figure 11:
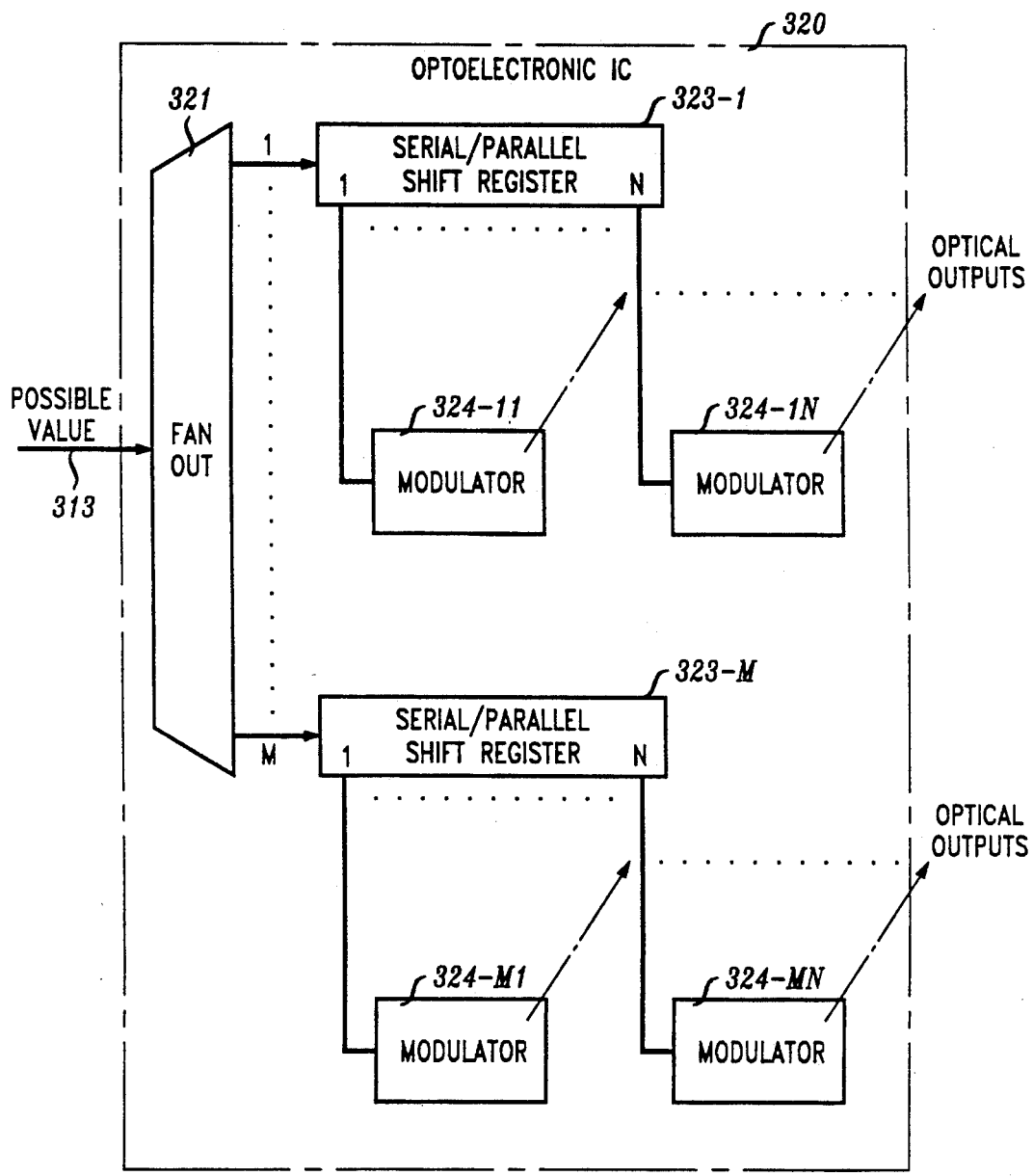
FIG. 11 is a circuit diagram of a first optoelectronic circuit in the embodiment of FIG. 10.

FIG. 10 is a diagram of a fourth embodiment comprising packet processing node 310. A controller 390 transmits a single, possible N-bit header value via line 313 to a fanout 321 (FIG. 11) of a first optoelectronic integrated circuit 320. Fanout 321 distributes M copies of the single possible value to M, N-bit serial/parallel shift registers 323-1 through 323-M. When the N bits of the M copies have been stored, they are transmitted as an array of optical beams by an array of modulators 324-11, 324-1N, 324-M1, 324-MN and are imaged via the free-space optical apparatus of FIG. 10 in a 1:1 fashion onto a second optoelectronic integrated circuit 340.

Figure 12:
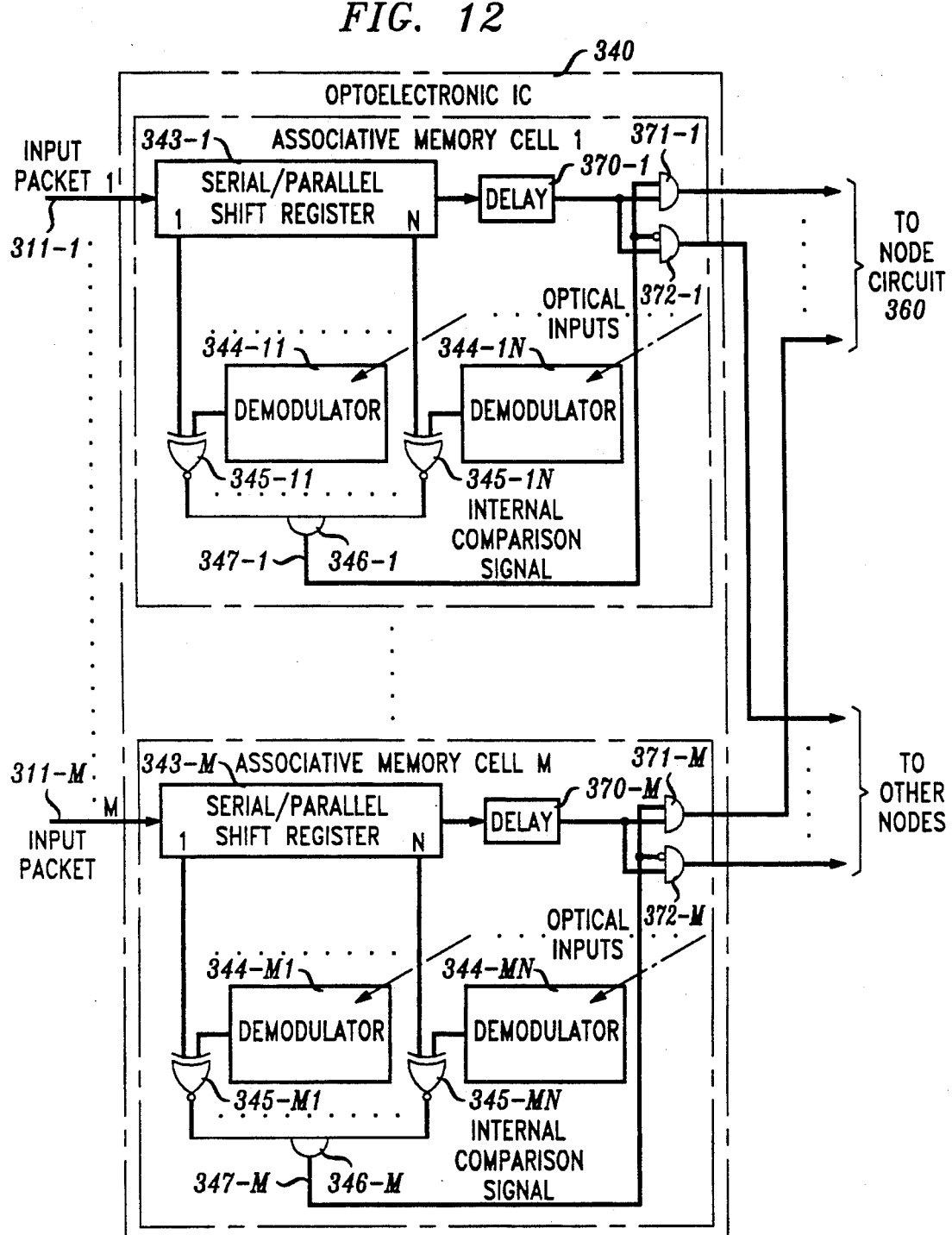
FIG. 12 is a circuit diagram of a second optoelectronic circuit in the embodiment of FIG. 10.

A plurality, M, of input packets including N-bit headers are received by circuit 340 (FIG. 12) as a plurality of serial, electrical signals on lines 311-1 through 311-M. The M packets are received by M, N-bit serial/parallel shift registers 343-1 through 343-M. The M copies of the single possible value, represented by the array of optical beams from circuit 320, are received by an array of demodulators 344-11, 344-1N, 344-M1, 344-MN. The demodulators transmit corresponding electrical signals to an array of exclusive NOR-gates 345-11, 345-1N, 345-M1, 345-MN, which also receive each bit stored in registers 343-1 through 343-M. The bit comparison results of one input packet header with one of the M possible value copies are combined by an associated one of M, AND-gates 346-1 through 346-M. When, for example, the input packet header stored by register 343-1 is equal to the corresponding possible value copy, AND-gate 346-1 transmits a logic one, internal comparison signal on line 347-1. Similarly, when the input packet header stored by register 343-M is equal to the corresponding possible value copy, AND-gate 346-M transmits a logic one, internal comparison signal on line 347-M. The M input packets from registers 343-1 through 343-M are delayed, for a time sufficient for internal comparison signals to be transmitted on lines 347-1 through 347-M, by a plurality of delay elements 370-1 through 370-M, and are transmitted as serial, electrical signals to a plurality of AND-gates 371-1 through 371-M, and to a plurality of AND-gates 372-1 through 372-M, each of the latter gates having one inverting input. When a logic one comparison is received on one of the lines 347-1 through 347-M, the associated one of the AND-gates 371-1 through 371-M transmits the input packet to a node circuit 360 which performs further packet processing for node 310. When a logic zero comparison signal is received on one of the lines 347-1 through 347-M, the associated one of the AND-gates 372-1 through 372-M transmits the input packet to one of a plurality of other packet processing nodes (not shown).

The invention is particularly advantageous for use in rapidly processing ATM cells which comprise five header bytes and 48 information bytes.

The free space optical configuration used in each of the embodiments is now described. In apparatus 10 (FIG. 1), for example, a collimated beam having a single linear polarization (s-polarization) is directed via lens 65 from a laser source 26 at a transmissive, two-dimensional spatially varying binary phase grating 64. Grating 24 divides the single beam into an array of individual, equal intensity beams as described in U.S. Pat. No. 5,113,286 issued to R. L. Morrison on May 12, 1992. Because the beams (not shown) transmitted from grating 64 have s-polarization, they are reflected from a diagonal surface of a polarization beam splitter 63 to a quarter-wave plate 62 which changes them to circular polarization. Because of the spatially varying phase delays introduced by grating 54, the beams are Fourier transformed by a compound lens 61 into individual spots on the surface of circuit 20.

Because circuit 20 is arranged to be placed at the focus of lens 61, the spots created are centered on individual modulators. The modulators have their reflectance state changed by the electric field applied from the associated electronic circuitry. The reflected beams (shown in FIG. 1) are transmitted via lens 61 to quarter-wave plate 62, where they are changed from circular polarization to p-polarization. The beams are transmitted through beam splitter 63 and are Fourier transformed by a compound lens 67 into an array of spots on circuit 40. The free-space optical apparatus of FIG. 1 performs 1:1 imaging. To perform 1:n imaging (n>1), a binary phase grating (not shown) is added between beam splitter 63 and lens 67. Using 1:n imaging would reduce the number of modulators required in the first optoelectronic circuit. The mounting of the elements of apparatus 10 (FIG. 1) is effected in the manner described in "A Six-Stage Digital Free-Space Optical Switching Network Using S-SEEDs", by F. B. McCormick, et al., *Applied Optics: Information Processing*, 1992 and "Optomechanics of a Free Space Photonic Switch: the Components", by J. L. Brubaker et al., *Optomechanics and Dimensional Stability*, Jul. 25–26, 1992, the details of which are unimportant to the present invention. Any suitable mounting arrangement, including an arrangement where the two optoelectronic circuits are mounted flat on a printed circuit board, may be used. The free-space optical apparatus shown in FIGS. 4, 7, and 10 is substantially the same as that shown in FIG. 1.

The modulators herein are multiple quantum well devices, specifically FET-SEED devices as described in "Operation of a Fully Integrated GaAs-Al$_x$Ga$_{1-x}$As FET-SEED: A Basic Optically Addressed Integrated Circuit", T. K. Woodward et al., *IEEE Photonics Technology Letters*, Vol. 4, No. 6, June 1992, pp. 614–617. The demodulators are also FET-SEED devices.

The fanout devices shown in FIGS. 2, 6, 9 and 11 could alternatively be external to the optoelectronic integrated circuits.

The input packets could alternatively be received as optical signals, in either serial or parallel format.

The invention is also usable more generally in rapidly comparing input bit strings and reference bit strings in a one-to-many or many-to-one fashion. One example is detection of the presence of a particular word or phrase in some input text. The comparisons performed in the four embodiments described herein require equality of all bits. Other predefined comparisons could be <, >, ←, →, not equal, or any other comparison of all or any subset of bits.

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. Packet processing apparatus comprising
    a first optoelectronic integrated circuit comprising first means for storing information and means for transmitting an array of optical beams representing said information stored by said first storing means, free space optical means for imaging said array of optical beams onto a second opto-electronic integrated circuit,
    said second circuit comprising second means for storing information and means for comparing the information represented by said array of optical beams received via said free space optical means, with said information stored by said second storing means,
    means responsive to at least one input packet for transmitting a header of said at least one input packet to one of said first and second storing means for storage therein,
    where the other of said first and said second storing means stores at least one possible value,
    wherein said second circuit further comprises means for generating a signal in response to a predefined comparison by said comparing means of said stored header with said stored possible value.

2. Apparatus in accordance with claim 1 where said one storing means is said first storing means, said transmitted array represents multiple copies of said header stored by said first storing means, where said second storing means stores a plurality of possible values, and said comparing means concurrently compares each of said multiple copies with a different one of said plurality of possible values.

3. Apparatus in accordance with claim 2 where said first storing means comprises a plurality of individual storing means each for storing a copy of said header.

4. Apparatus in accordance with claim 3 where said header transmitting means transmits said header to each of said plurality of individual storing means.

5. Apparatus in accordance with claim 4 where said header transmitting means is part of said first circuit.

6. Apparatus in accordance with claim 1 where said header transmitting means is part of said first circuit.

7. Apparatus in accordance with claim 1 where said other storing means stores a plurality of possible values, said other storing means is said first storing means, said transmitted array represents said plurality of possible values, where said one storing means stores multiple copies of said header, said one storing means is said second storing means, and said comparing means concurrently compares each of said multiple copies with a different one of said plurality of possible values.

8. Apparatus in accordance with claim 7 where said second storing means comprises a plurality of individual storing means each for storing a copy of said header.

9. Apparatus in accordance with claim 8 where said header transmitting means transmits said header to each of said plurality of individual storing means.

10. Apparatus in accordance with claim 9 where said header transmitting means is part of said second circuit.

11. Apparatus in accordance with claim 1 where said header transmitting means is part of said second circuit.

12. Apparatus in accordance with claim 1 wherein said input packet is received by said header transmitting means as a serial, electrical signal.

13. Apparatus in accordance with claim 1 wherein said input packet is received by said header transmitting means as an optical signal.

14. Apparatus in accordance with claim 1 wherein said generated signal comprises information associated with the one of said plurality of possible header values resulting in said predefined comparison.

15. Apparatus in accordance with claim 14 further comprising means for transmitting an output packet including said associated information and information from said at least one input packet.

16. Apparatus in accordance with claim 15 wherein said output packet is transmitted as a serial, electrical signal.

17. Apparatus in accordance with claim 15 wherein said output packet is transmitted as an optical signal.

18. Apparatus in accordance with claim 14 further comprising
third means for storing said associated information.

19. Apparatus in accordance with claim 18 further comprising
means for loading said associated information in said third storing means during establishment of a virtual circuit.

20. Apparatus in accordance with claim 1 wherein said header transmitting means is responsive to a plurality of input packets for transmitting headers of said plurality of input packets to said one storing means for storage therein, said other storing means stores multiple copies of only one possible value, and said comparing means concurrently compares each of said multiple copies with a header from a different one of said plurality of input packets.

21. Apparatus in accordance with claim 20 wherein said one storing means is said first storing means and said array of optical beams represents said headers from said plurality of input packets.

22. Apparatus in accordance with claim 20 wherein said other storing means is said first storing means and said array of optical beams represents said multiple copies.

23. Apparatus in accordance with claim 20 wherein said plurality of input packets are received by said header transmitting means as a plurality of serial, electrical signals.

24. Apparatus in accordance with claim 20 wherein said plurality of input packets are received by said header transmitting means as a plurality of optical signals.

25. Apparatus in accordance with claim 1 wherein said array transmitting means comprises a plurality of multiple quantum well devices.

26. Apparatus in accordance with claim 25 wherein said plurality of multiple quantum well devices are FET-SEED devices.

27. Apparatus in accordance with claim 1 wherein said at least one input packet is an ATM cell.

28. Comparison apparatus comprising
a first optoelectronic integrated circuit comprising first means for storing information and means for transmitting an array of optical beams representing said information stored by said first storing means,
free space optical means for imaging said array of optical beams onto a second opto-electronic integrated circuit,
said second circuit comprising second means for storing information and means for comparing the information represented by said array of optical beams received via said free space optical means, with said information stored by said second storing means,
means for transmitting at least one input bit string to said first storing means for storage therein,
where said second storing means stores a plurality of reference bit strings,
wherein said second circuit further comprises means for generating a signal in response to a predefined comparison by said comparing means of said at least one stored input bit string with at least one of said stored plurality of reference bit strings,
where said transmitted array represents multiple copies of said stored input bit string, and said comparing means concurrently compares each of said multiple copies with a different one of said stored plurality of reference bit strings.

29. Apparatus in accordance with claim 28 wherein said signal is a single bit.

30. Apparatus in accordance with claim 28 wherein said signal is a reference bit string resulting in said predefined comparison.

31. Apparatus in accordance with claim 28 wherein said signal is a bit string associated with a reference bit string resulting in said predefined comparison.

32. Apparatus in accordance with claim 28 where said input bit string is received by said input bit string transmitting means as a serial, electrical signal.

33. Apparatus in accordance with claim 28 where said input bit string is received by said input bit string transmitting means as an optical signal.

34. Apparatus in accordance with claim 28 wherein said array transmitting means comprises a plurality of multiple quantum well devices.

35. Apparatus in accordance with claim 34 wherein said plurality of multiple quantum well devices are FET-SEED devices.

36. Apparatus in accordance with claim 28 wherein said imaging means performs 1:n imaging, where n is a positive integer.

37. Comparison apparatus comprising
a first optoelectronic circuit comprising first means for storing information and means for transmitting an array of optical beams representing said information stored by said first storing means,
free space optical means for imaging said array of optical beams onto a second opto-electronic circuit,
said second circuit comprising second means for storing information and means for comparing the information represented by said array of optical beams received via said free space optical means, with said information stored by said second storing means,
means for transmitting at least one input bit string to said second storing means for storage therein,
where said first storing means stores a plurality of reference bit strings,
wherein said second circuit further comprises means for generating a signal in response to a predefined comparison by said comparing means of said stored at least one input bit string with at least one of said stored plurality of reference bit strings,
where said transmitted array represents said stored plurality of reference bit strings, said second storing means stores multiple copies of said at least one input bit string, and said comparing means concurrently compares each of said multiple copies with a different one of said plurality of stored reference bit strings.

38. Apparatus in accordance with claim 37 wherein said signal is a single bit.

39. Apparatus in accordance with claim 37 wherein said signal is a reference bit string resulting in said positive comparison.

40. Apparatus in accordance with claim 37 wherein said signal is a bit string associated with a reference bit string resulting in said positive comparison.

41. Apparatus in accordance with claim 37 where said input bit string is received by said input bit string transmitting means as a serial, electrical signal.

42. Apparatus in accordance with claim 37 where said input bit string is received by said input bit string transmitting means as an optical signal.

43. Apparatus in accordance with claim 37 wherein said array transmitting means comprises a plurality of multiple quantum well devices.

44. Apparatus in accordance with claim 43 wherein said plurality of multiple quantum well devices are FET-SEED devices.

45. Apparatus in accordance with claim 37 wherein said imaging means performs 1:n imaging, where n is a positive integer. beams represents said plurality of input bit strings.

46. Comparison apparatus comprising
a first optoelectronic integrated circuit comprising first means for storing information and means for transmitting an array of optical beams representing said information stored by said first storing means,
free space optical means for imaging said array of optical beams onto a second opto-electronic integrated circuit,
said second circuit comprising second means for storing information and means for comparing the information represented by said array of optical beams received via said free space optical means, with said information stored by said second storing means,
means for transmitting a plurality of input bit strings to said first storing means for storage therein,
where said second storing means stores at least one reference bit string,
wherein said second circuit further comprises means for generating a signal in response to a predefined comparison by said comparing means of at least one of said stored plurality of input bit strings with said stored at least one reference bit string,
where said transmitted array represents said stored plurality of input bit strings, where said second storing means stores multiple copies of said at least one reference bit string, and said comparing means concurrently compares each of said stored plurality of input bit strings with a different one of said multiple copies.

47. Apparatus in accordance with claim 46 where said plurality of input bit strings are received by said input bit string transmitting means as serial, electrical signals.

48. Apparatus in accordance with claim 46 where said plurality of input bit strings are received by said input bit string transmitting means as optical signals.

49. Apparatus in accordance with claim 46 wherein said array transmitting means comprises a plurality of multiple quantum well devices.

50. Apparatus in accordance with claim 49 wherein said plurality of multiple quantum well devices are FET-SEED devices.

51. Apparatus in accordance with claim 46 wherein said imaging means performs 1:n imaging, where n is a positive integer.

52. Comparison apparatus comprising
a first optoelectronic integrated circuit comprising first means for storing information and means for transmitting an array of optical beams representing said information stored by said first storing means,
free space optical means for imaging said array of optical beams onto a second opto-electronic integrated circuit,
said second circuit comprising second means for storing information and means for comparing the information represented by said array of optical beams received via said free space optical means, with said information stored by said second storing means,
means for transmitting at least one reference bit string to said first storing means for storage therein,
where said second storing means stores a plurality of input bit strings,
wherein said second circuit further comprises means for generating a signal in response to a predefined comparison by said comparing means of said stored at least one reference bit string with at least one of said stored plurality of input bit strings,
where said transmitted array represents multiple copies of said stored at least one reference bit string, and said comparing means concurrently compares each of said multiple copies with a different one of said stored plurality of input bit strings.

53. Apparatus in accordance with claim 52 where said plurality of input bit strings are received by said second storing means as serial, electrical signals.

54. Apparatus in accordance with claim 52 where said plurality of input bit strings are received by said second storing means as optical signals.

55. Apparatus in accordance with claim 52 wherein said array transmitting means comprises a plurality of multiple quantum well devices.

56. Apparatus in accordance with claim 55 wherein said plurality of multiple quantum well devices are FET-SEED devices.

57. Apparatus in accordance with claim 52 wherein said imaging means performs 1:n imaging, where n is a positive integer.

* * * * *